Oct. 20, 1959  H. M. HENDRY  2,909,002
FERTILIZER AND IRRIGATION SYSTEM
Filed Oct. 2, 1957  4 Sheets-Sheet 2
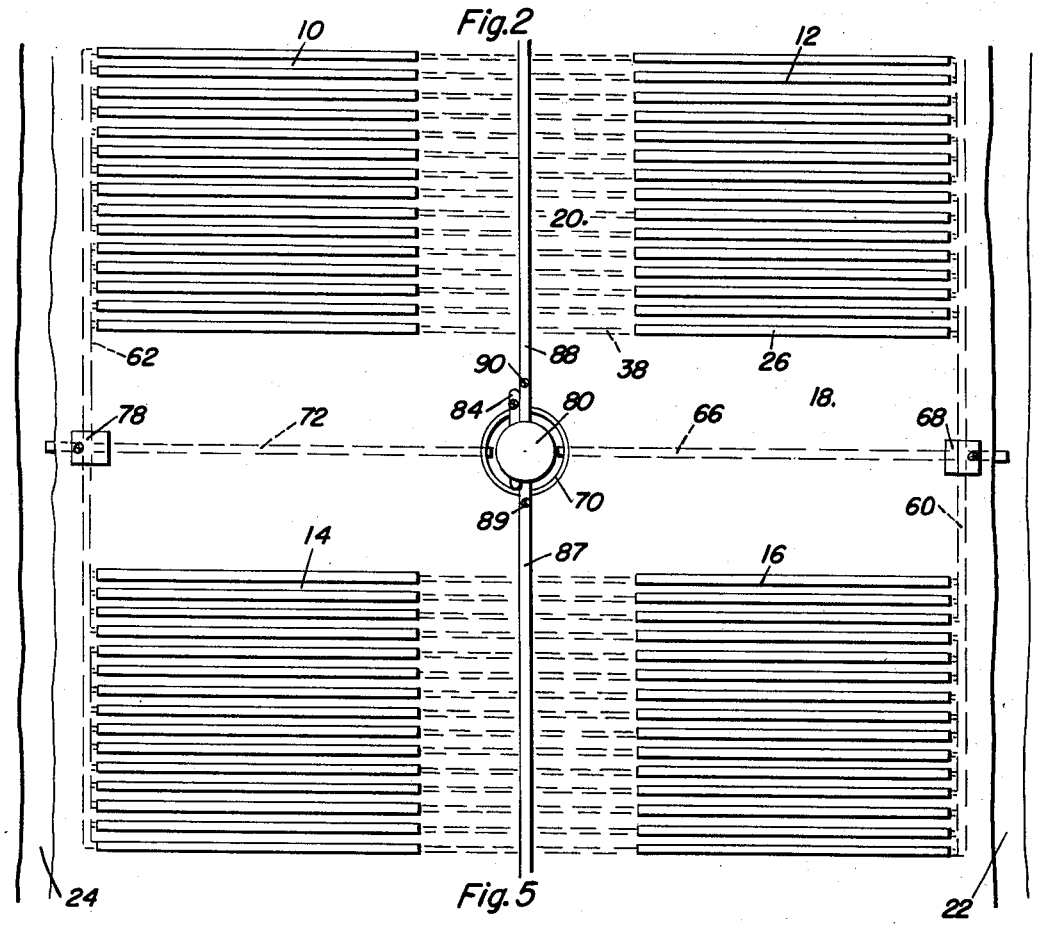
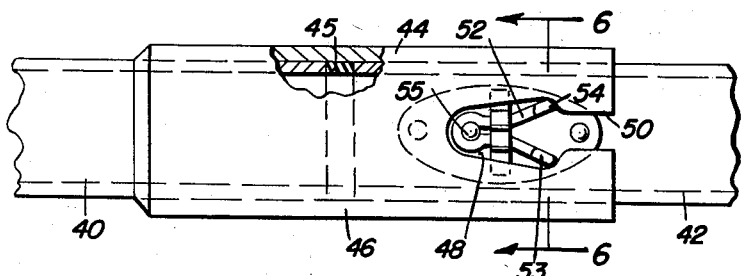
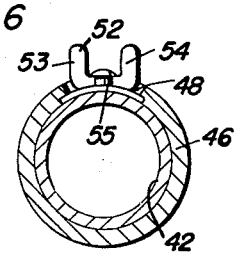
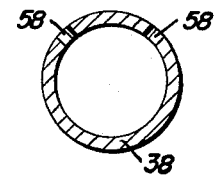
Hubert M. Hendry
INVENTOR.

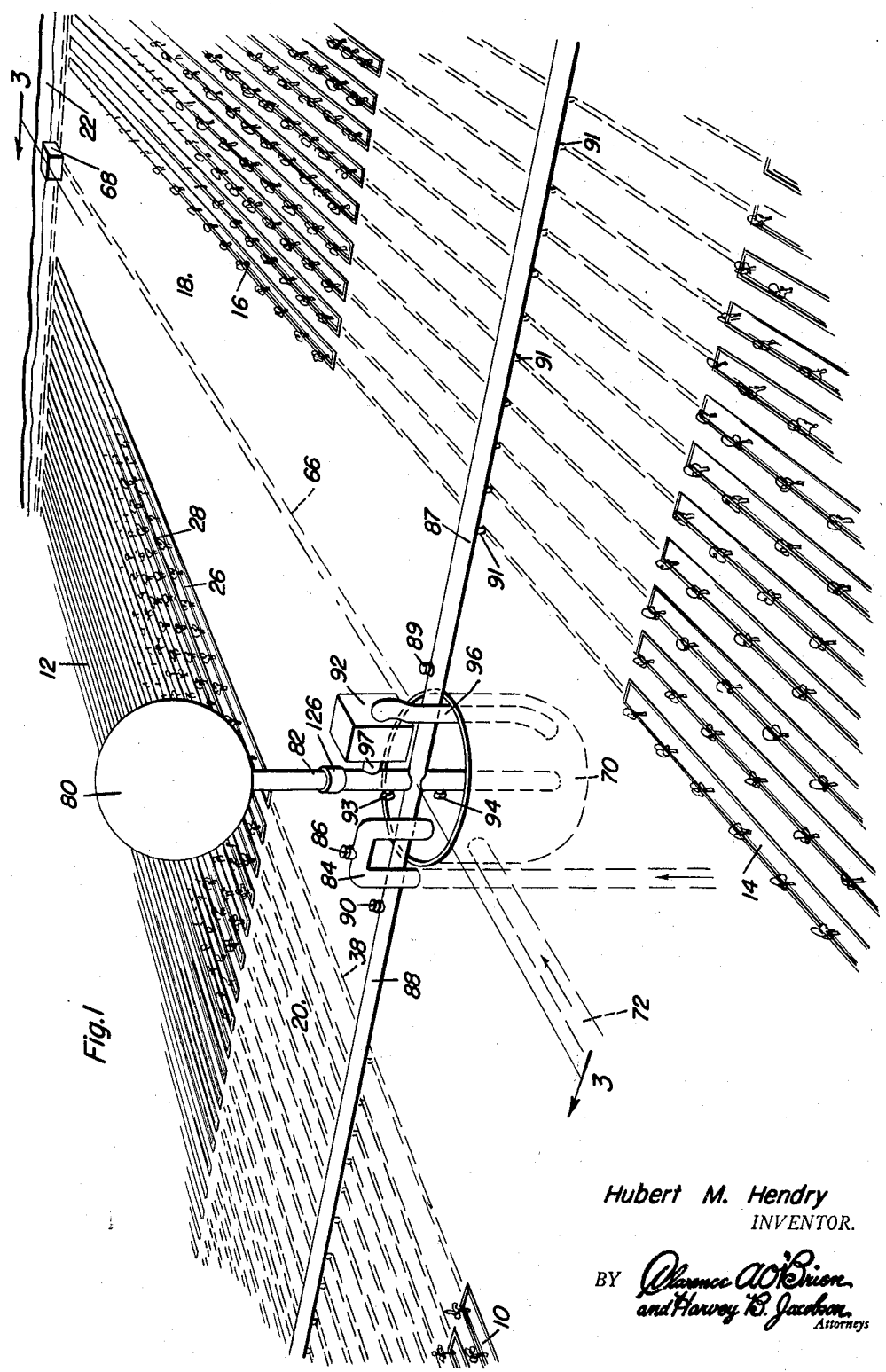

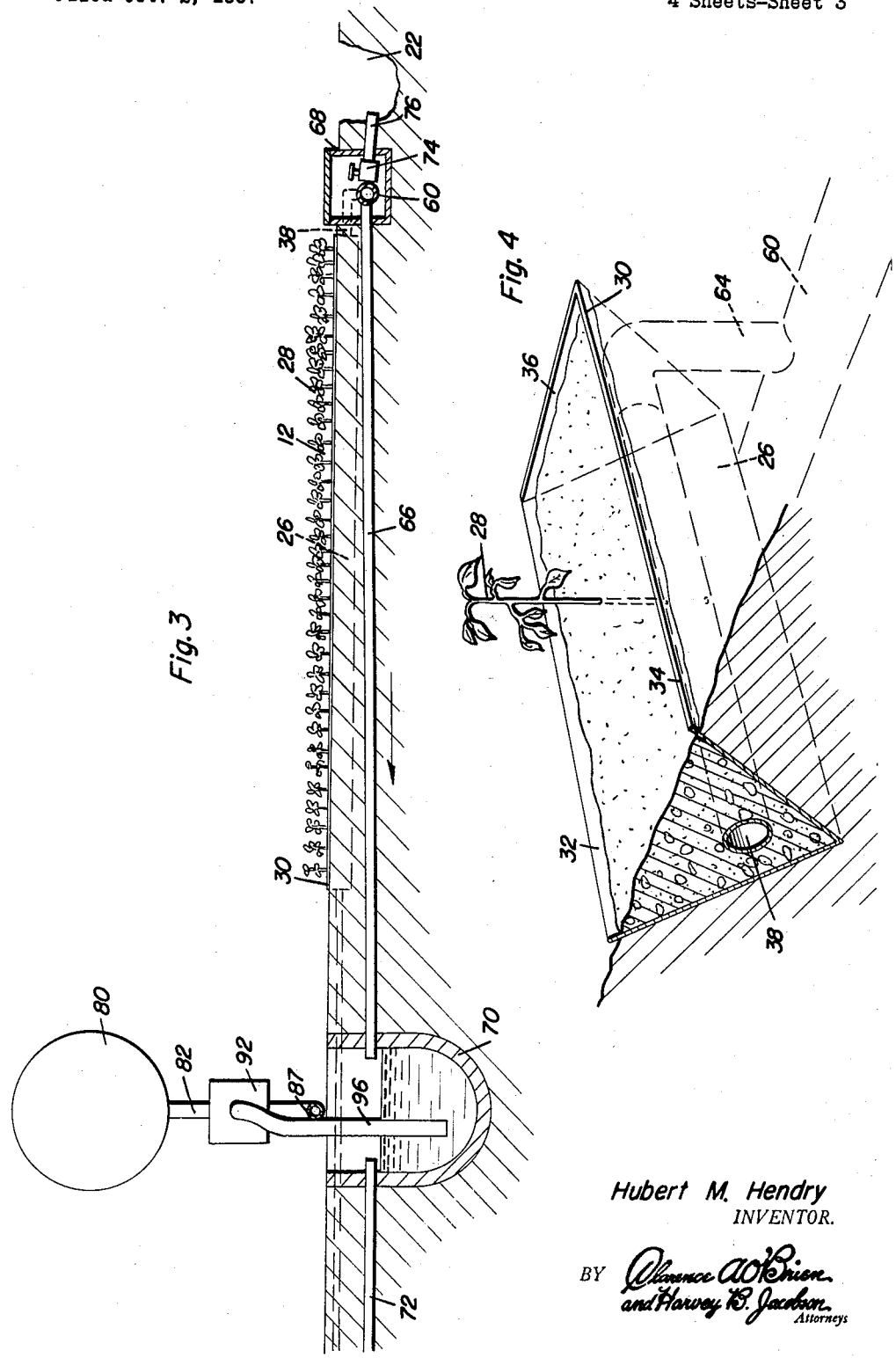

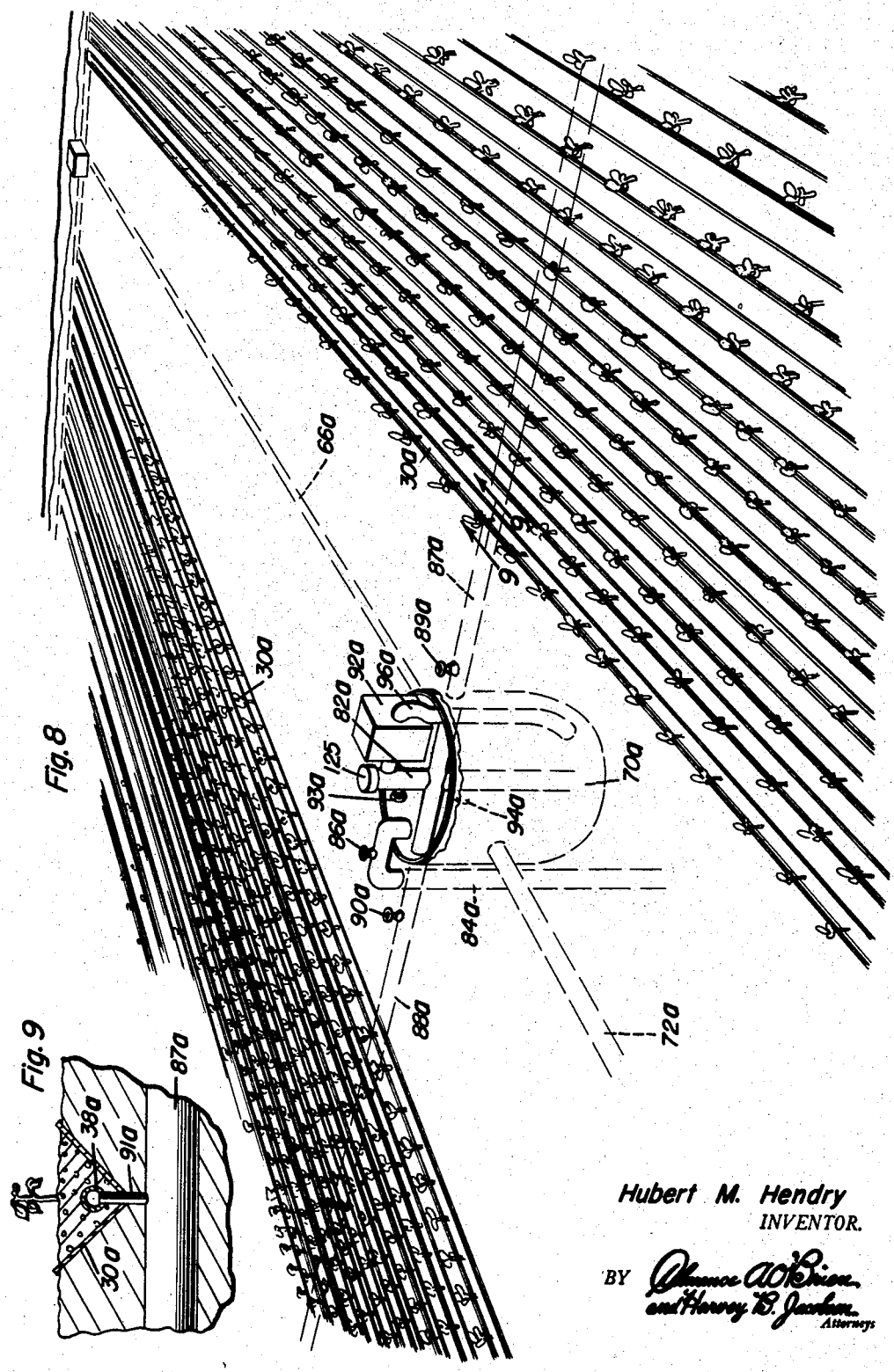

United States Patent Office
2,909,002
Patented Oct. 20, 1959

2,909,002

FERTILIZER AND IRRIGATION SYSTEM

Hubert M. Hendry, Naples, Fla.

Application October 2, 1957, Serial No. 687,770

14 Claims. (Cl. 47—1)

This invention relates to a controlled irrigating and fertilizing system for plants that are in soil.

An object of this invention is to provide a system for economical and effective controlled fertilizing and irrigating of plants that are set in gravel or other material. Each plant receives exactly the elements that it needs for maximum growth, there being substantially no waste of liquid and fertilizer. That which is unnecessary and unused is returned in the system for recirculation.

By my invention an entire field can be fertilized or watered in a matter of minutes. The result is that the crop yield per acre is increased and at the same time the cost in material and manpower is reduced. Due to the economy of the system, the fertilizer and water costs are reduced to a bare minimum, it being understood that losses due to evaporation are unavoidable in an open field type of bed.

Another object of the invention is to provide a system for both irrigating and/or fertilizing with liquid fertilizer, the system being arranged in a pattern of rows of plants, the rows being formed by subsoil or at least partially subsoil gutters within which feeders are located, the feeders being supplied through supply pipes that receive water and/or fertilizer from an elevated supply tank. This general organization features an improvement in the manner by which the supply pipes are fed. Water is obtained from a well or other source and pumped into a mixing and recovery tank. A main conduit extends from the recovery tank to the supply tank and there is a pump which draws water from the mixing and recovery tank and delivers it to the elevated water and fertilizer supply tank. The fertilizer is to be placed in the mixing tank together with the water that is extracted from the well or other source of water. Then, by valve manipulation, the supply pipes are closed and the pump operated, thereby requiring the water to be lifted from the recovery tank and placed into the supply tank. Then, by proper manipulation of the valves in the conduit and by opening the valves in the supply pipes, the supply pipes are gravity fed with water and fertilizer so that this may be distributed throughout the field.

This organization of components in a system enables the water and liquid fertilizer to be agitated and thoroughly mixed in the mixing and recovery tank before being elevated to the supply tank. If additional agitation and mixing is desired, the supply pipe valves are closed and the two valves in the conduit located on opposite sides of the supply pipes are opened, causing liquid to rush from the supply tank into the mixing tank. The motion of the liquid helps to mix the water and liquid fertilizer in preparation of returning it through the same conductor to the elevated supply tank.

A further object of the invention is to provide a unique coupling for the feeders. This coupling enables the lengths of feeder pipe to be quickly connected or disconnected by simply slipping the confronting ends thereof together. There is a collar on one end that has an opening registered with a reduced entrance. A spring latch is on the other end of the length of pipe, the spring finger or fingers of the clip passing through the entrance and expanding in the opening in the collar.

Another object of the invention is to provide a system as described above wherein the residual liquid is collected in a header at the downstream ends of the gutters and gravity returned to the mixing and recovery tank for recirculation. Should any of this liquid be unnecessary or undesired, it is disposable through a drain ditch at the downstream ends of the troughs. The quantity of disposed of liquid is controllable by valves in the collection header through which the accumulated liquid must pass prior to being returned to the mixing and recovery tank.

Another object of the invention is to provide an irrigation and/or fertilizing system as described previously but omitting the elevated water and fertilizer supply tank. The tank is replaced by a surface ground pump so that the liquid will be delivered through the fields by positive pump pressure rather than the pressure head formed by the overhead tank. Accordingly, the invention comprehends these alternatives as well as others.

Other objects and features of importance will become apparent in following the description of the illustrated form of the invention.

In the drawings:

Figure 1 is a fragmentary, perspective view of a typical system in accordance with my invention;

Figure 2 is a top view of the system in Figure 1;

Figure 3 is a sectional view on enlarged scale taken approximately on the line 3—3 of Figure 1;

Figure 4 is an enlarged, fragmentary, perspective view showing the construction of one of the gutters and a feeder in that gutter;

Figure 5 is an enlarged, fragmentary, top view of the means for joining the lengths of pipe that form one of the feeders;

Figure 6 is a sectional view taken on the line 6—6 of Figure 5;

Figure 7 is a sectional view of one of the feeders showing the liquid leakage holes in it through which the soil in the gutters obtains moisture for the plants;

Figure 8 is a perspective view of a modification of the invention;

Figure 9 is an enlarged sectional view taken on the line 9—9 of Figure 8.

In the accompanying drawings there is a typical system in accordance with the invention. This system is composed of four beds (Figure 2) 10, 12, 14 and 16 respectively, the beds being separated by intersecting roads 18 and 20 and having two drain ditches 22 and 24 at the downstream ends of the rows in the beds. Although four beds are shown, the principles of the invention may be practiced in connection with one or more such beds. Bed 12 is constructed of a number of rows 26 (Figure 3) and each row has plants 28 arranged in line. Gutters 30 are formed of flexible material, as asphalt impregnated paper or some other kind of paper. Sides 32 and 34 are arranged in upwardly diverging V-shape and there is an end panel 36 connected at each end. Feeder 38 in the form of a liquid conductor is disposed in the gutter 30, there being a single feeder for each gutter and a gutter in each row of each of the beds. Feeder 38 is made of a plurality of lengths of pipe, such as lengths 40 and 42 (Figure 5), connected together by coupling 44 and having a soft washer 45 therebetween. The pipe may be of metal, plastic or other material, and the same holds true for the gutter 30. Not only is plastic a variant for gutter 30 and all the other gutters, but also the gutters may be formed by spraying asphalt or some other inexpensive material in furrows that are formed in the soil.

Coupling 44 consists of a collar 46 attached to one end of the length 40 of pipe and accepting the confronting end of the length 42 of pipe. An opening 48 is formed in the side wall of collar 46 and the reduced entrance 50 is registered with the opening. Clamp 52 is engageable with opening 48 and is constructed of a pair of spring fingers 53 and 54 mounted on spindle 55 that is carried by the pipe length 42. The spring fingers are normally expanded (Figure 5), but are capable of flexing toward each other when the lengths 40 and 42 are assembled by fitting the length 42 in collar 46. After sliding through the reduced entrance 50, the inherent elasticity of the spring fingers 53 and 54 causes them to return to the position shown in Figure 5 and thereby hold the lengths of feeder pipe assembled. Liquid holes 58 are formed at spaced intervals along the length of each feeder and in the gutters so that the plants 28 can obtain moisture from the surrounding soil that receives the moisture from the feeders.

The downstream ends of each of the feeders empty into headers. In Figure 2 there are two headers 60 and 62, with header 60 servicing bed 12 that is shown in detail in other figures of the drawings. Feeder 38 for gutter 30 has an elbow 64 turned downwardly and connected to header 60 (Figures 3 and 4) so that excess liquid is drained from the feeder 38 of gutter 30 into the header 60. Return drain pipe 66 is attached to header 60 in ground box 68. Return drain pipe 66 has a sufficient pitch so that liquid will gravity return to the mixing and recovery tank 70. An identical return drain pipe 72 is operatively connected with the header 62 and the mixing and recovery tank and for the same reason. Valve 74 is connected with the header 60 to enable the operator to drain off any excess liquid through the short pipeline 76 that empties into drain ditch 22. The valve is in a protective position within the ground box 68. Ground box 78 protects a valve which corresponds to valve 74 but which services header 62 and which discharges into ditch 24.

Water and/or liquid fertilizer or water having other species of fertilizer in suspension are the liquids which are handled by my system. The feeders in the gutters are supplied from a water and fertilizer supply tank 80 supported in an elevated position above the mixing and recovery tank 70. Conduit 82 extends from the bottom of supply tank 80 to a location about a foot from the bottom of mixing and recovery tank 70 in order to constitute a sediment chamber at the bottom of the mixing and recovery tank and to provide a splash area to promote thorough mixing by the velocity of liquid discharged through the lower open end of conduit 82. Water from a well or some other source is pumped through pipe 84 into mixing and recovery tank 70. This pipe has a valve 86 to control the flow through it. Supply pipes 87 and 88 are attached to the conduit 82 at a place between the tanks 70 and 80. Control valves 89 and 90 are in the supply pipes 87 and 88 and are preferably, but not necessarily, of the manually operated type. Supply pipes 87 and 88 are above grade and they have short supply branches 91 which extend vertically from the bottom thereof and connect to the feeders. The feeders of opposite beds, for example, beds 12 and 10, may be simultaneously supplied by having the feeders of a length sufficient to pass under the road 20.

There are means including pump 92 for delivering water or water mixed with liquid fertilizer or simply fertilizer from a point approximately a foot from the bottom of mixing and recovery tank 70 to the conduit 82 above the upper control valve 93. This upper control valve is located between the supply pipes 87, 88 and the water and fertilizer supply tank 80. A lower control valve 94 is located between the supply pipes and the mixing and recovery tank 70. The remainder of the means for so delivering the water and/or fertilizer consists in pipes 96 and 97 which attach to the inlet and discharge ends of pump 92 and which are respectively located with tank 70 and attached to the conduit 82.

In operation, the fertilizer is emptied into the mixing and recovery tank 70 and a proper amount of water mixed with it. This mixture is pumped into the supply tank 80 by first opening valves 93 and 94 and closing valves 89 and 90. Thereafter, valves 93 and 94 are closed and valves 89 and 90 opened to permit the liquid from tank 80 to flow throughout the rows of the beds by passing through the network of pipes and feeders in the manner described previously. The quantity of liquid that is desired to be recovered is recovered by adjusting valves 74 and thereby enabling the headers 60 and 62 to collect the desired quantity of liquid and deliver the same to the return drain pipes 66 and 72. These empty into the mixing and recovery tank 70. By momentarily opening valves 93 and 94, liquid from tank 80 rushing into tank 70 is capable of being used for admixing the fertilizer and water in the mixing and recovery tank 70.

Refer now to the modification in Figures 8 and 9. The depicted system is essentially the same as that of Figure 1 and uses much the same equipment. Tank 70a is fed water from a well through pipe 84a having valve 86a in it. Field supply pipes 87a and 88a are attached to conduit 82a so that liquid can be fed supply pipes 87a and 88a when valve 93a is open and valve 94a in pipe 82a is closed.

Tank 80 is omitted from Figure 8 and conduit 82a has a cap 125 at its upper end. Coupling 126 (Figure 1) is to enable the systems to be interchanged. The pump 92a will be used to mix liquid fertilizer in tank 70 by circulating through pipe 96a and conduit 82a, and then pump the mixed liquids into supply pipes 87a and 88a. These are controlled by valves 89a and 90a.

Figures 8 and 9 exemplify that alterations in the fields are contemplated. Road 20 has been omitted, leaving only road 18a. Moreover, supply pipes 87a and 88a are below ground requiring that the short supply branches rise up instead of drop down to the feeders 38a in typical gutter 30a. Return drain pipes 66a and 72a are identical to corresponding pipes 66 and 72 in Figure 1.

Other changes which are within the scope of the following claims may be made.

What is claimed as new is as follows:

1. A controlled irrigating and fertilizing system for plants, said system comprising a mixing and recovery tank, a conduit opening into said tank, means including a pump for drawing water and fertilizer from said mixing and recovery tank and elevating it and returning it through said conduit to said tank, at least one supply pipe attached to said conduit, a valve in said conduit between said mixing tank and said supply pipe, a plurality of plant supporting gutters, a liquid conducting feeder for each gutter, said feeders disposed in said gutters and connected to said supply pipe, spaced liquid outlets in said feeders, and means including a return drain pipe for conducting excess liquid from said gutters to said mixing and recovery tank.

2. A controlled irrigating and fertilizing system for plants in soil, said system comprising an elevated water and/or fertilizer supply tank, a mixing and recovery tank below said supply tank, a conduit connecting said tanks, means including a pump for drawing water and fertilizer from said mixing tank and elevating it through said conduit to said supply tank, at least one supply pipe attached to said conduit between said tanks, a valve in said conduit between said mixing tank and said pipe, a plurality of soil and plant supporting gutters, a feeder for each gutter, said feeders being disposed in said gutters and connected to said supply pipe, spaced liquid outlets in said feeders, a return drain pipe connected to said mixing tank, a header connected with said feeders at the downstream ends thereof and to said return drain pipe.

3. A controlled irrigating and fertilizing system for plants in soil, said system comprising an elevated water and/or fertilizer supply tank, a mixing and recovery tank below said supply tank, a conduit connecting said tanks, means including a pump for drawing water and fertilizer from said mixing tank and elevating it through said conduit to said supply tank, at least one supply pipe attached to said conduit between said tanks, a valve in said conduit between said mixing tank and said pipe, a plurality of soil and plant supporting gutters, a feeder for each gutter, said feeders being disposed in said gutters and connected to said supply pipe, spaced liquid outlets in said feeders, a return drain pipe connected to said mixing tank, a header connected with said feeders at the downstream ends thereof and to said return drain pipe, a drain ditch adjacent to said gutters, and means including a valve connected with said header for controlling the discharge of liquid into said drain ditch.

4. A controlled irrigating and fertilizing system for plants in soil, said system comprising an elevated water and/or fertilizer supply tank, a mixing and recovery tank below said supply tank, a conduit connecting said tanks, means including a pump for drawing water and fertilizer from said mixing tank and elevating it through said conduit to said supply tank, at least one supply pipe attached to said conduit between said tanks, a valve in said conduit between said mixing tank and said pipe, a plurality of soil and plant supporting gutters, a feeder for each gutter, said feeders being disposed in said gutters and connected to said supply pipe, spaced liquid outlets in said feeders, a return drain pipe connected to said mixing tank, a header connected with said feeders at the downstream ends thereof and to said return drain pipe, a control valve in said supply pipe which when closed and the valve in said conduit is open enables liquid to flow directly from said supply tank to said mixing tank to agitate and mix the fertilizer and water prior to drawing the mixed fertilizer and water into said supply tank.

5. The system of claim 2 wherein said gutters are constructed of downwardly converging side walls of flexible material.

6. The system of claim 2 wherein said feeders are composed of lengths of pipe, and couplings joining the confronting ends thereof.

7. The system of claim 2 wherein said feeders are composed of lengths of pipe, and couplings joining the confronting ends thereof, said couplings each comprising a collar having an opening, a reduced entrance connected with said collar opening, and releasable means adapted to pass through said entrance and spread in said opening.

8. In an irrigating and/or fertilizing system for a bed which is made of rows of plants, substantially V-shaped gutters adapted to accommodate soil and which define said rows, feeders extending longitudinally within said gutters and consisting essentially of lengths of pipe, quick connect couplings joining said lengths of pipe, and said lengths of pipe having spaced drain holes through which liquid is adapted to seep, gravitationally operated means to deliver liquid to said feeders and including a supply tank having a conduit extending therefrom, supply pipes attached to said conduit and communicated with said feeders, said gutters being angulated slightly to a downstream end, an excess liquid accumulating header at the downstream ends of said gutters and in registry with the feeders in said gutters, and return drain means connected with said headers.

9. In an irrigating and/or fertilizing system for a bed which is made of rows of plants, substantially V-shaped gutters adapted to accommodate soil and which define said rows, feeders extending longitudinally within said gutters and consisting essentially of lengths of pipe, quick connect couplings joining said lengths of pipe, and said lengths of pipe having spaced drain holes through which liquid is adapted to seep, gravitationally operated means to deliver liquid to said feeders and including a supply tank having a conduit extending therefrom, supply pipes attached to said conduit extending therefrom, supply pipes attached to said conduit and communicated with said feeders, said gutters being angulated slightly to a downstream end, an excess liquid accumulating header at the downstream ends of said gutters and in registry with the feeders in said gutters, and return drain means connected with said headers, a recovery tank with which said return drain means are connected, and said conduit being disposed in part within said recovery tank, and means including a pump for delivering liquid from said recovery tank to said conduit and for applying the same into said supply tank.

10. In a fertilizer and/or irrigation system of the type which includes a bed of plants arranged in rows and adapted to be tractor cultivated, a second bed adjacent to said first bed and having a road separating the beds and sufficiently wide for a tractor to be manipulated therein, feeders for each row, subsoil gutters accommodating said feeders, means to apply liquid to said feeders, means at the downstream ends of said feeders for collecting excess liquid and returning the same to said means for recirculation.

11. The system of claim 10 wherein said means to supply said feeders includes a mixing and recovery tank within which the excess returned liquid is deposited, said mixing tank being adapted to receive fertilizer for mixing with water, a supply tank, a conduit extending from said supply tank and from which said feeders are fed, and means including a pipe in said mixing tank for withdrawing liquid from said mixing and recovery tank to said supply tank.

12. The controlled irrigation and fertilizing system described in claim 1 and a coupling in said conduit by which to attach a hydrostatic supply tank above said mixing and recovery tank so that said system is interchangeable between pump supplied and a hydrostatic pressure supplied.

13. In a system for irrigating and for fertilizing plants, the combination of a mixing tank, means for supplying the tank with water, at least one supply pipe to furnish water and/or fertilizer to the plants, a conduit to which said pipe is connected and having an end in said tank, and means including a pump with pipes connecting the tank with said conduit above the junction of said supply pipe and conduit for delivering the liquid to the supply pipe.

14. In a system for irrigating and for fertilizing plants, the combination of a mixing tank, means for supplying the tank with water, at least one supply pipe to furnish water and/or fertilizer to the plants, a conduit to which said pipe is connected and having an end in said tank, and means including a pump with pipes connecting the tank with said conduit above the junction of said supply pipe and conduit for delivering the liquid to the supply pipe, said liquid delivering means being interchangeable between a gravity flow and a mechanical delivery system by having a coupling in said conduit above said tank and pump by which to selectively connect a storage tank and cap onto the conduit.

References Cited in the file of this patent

FOREIGN PATENTS

| 1,022,678 | France | Dec. 17, 1952 |
| 1,051,668 | France | Sept. 16, 1953 |